Figure 1:
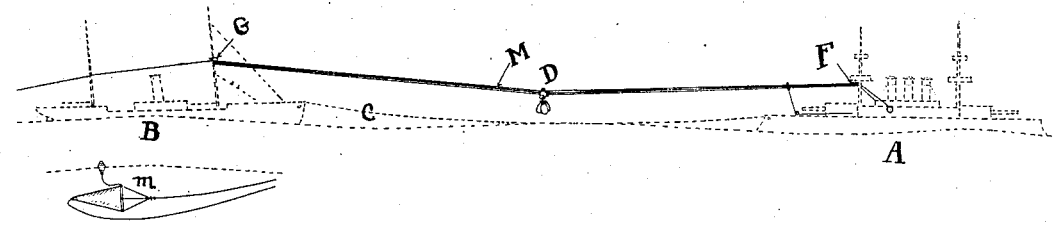

No. 786,510. PATENTED APR. 4, 1905.
T. S. MILLER.
CONVEYING APPARATUS.
APPLICATION FILED JAN. 31, 1901.

5 SHEETS—SHEET 1.

Witnesses
H. L. Reynolds.
Chas. J. Rathjen.

Inventor
Thomas Spencer Miller.
By his Attorneys
Gifford & Bull

No. 786,510. PATENTED APR. 4, 1905.
T. S. MILLER.
CONVEYING APPARATUS.
APPLICATION FILED JAN. 31, 1901.
5 SHEETS—SHEET 2.
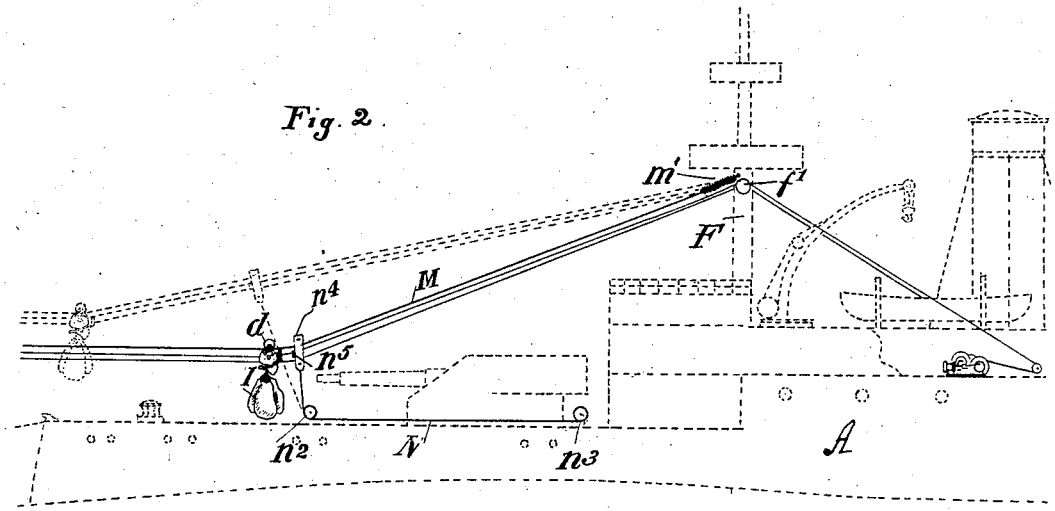
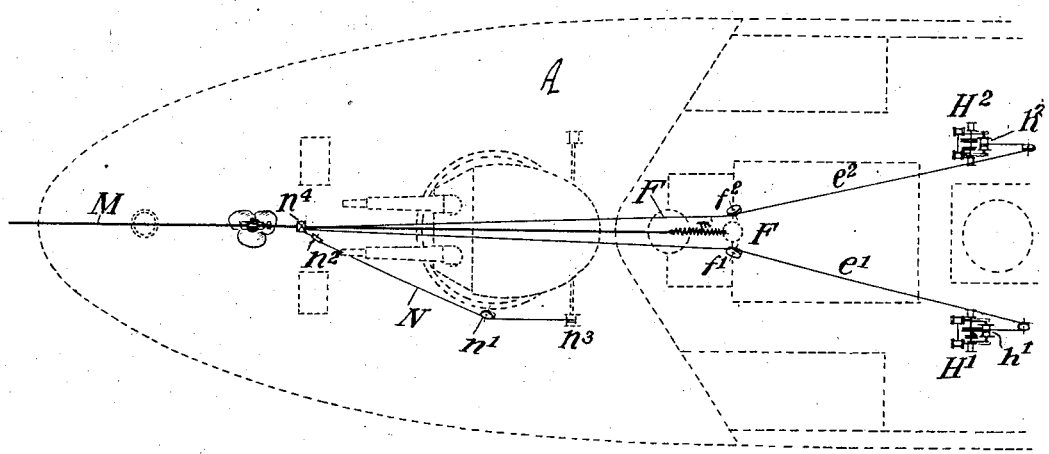

No. 786,510. PATENTED APR. 4, 1905.
T. S. MILLER.
CONVEYING APPARATUS.
APPLICATION FILED JAN. 31, 1901.

5 SHEETS—SHEET 3.

Witnesses
H. L. Reynolds.
Chas. J. Rathjen.

Inventor
Thomas Spencer Miller
By his Attorneys,
Gifford & Bull.

No. 786,510. PATENTED APR. 4, 1905.
T. S. MILLER.
CONVEYING APPARATUS.
APPLICATION FILED JAN. 31, 1901.

5 SHEETS—SHEET 4.

Witnesses
H. L. Reynolds.
Chas. J. Rathjin

Inventor
Thomas Spencer Miller
By his Attorneys
Gifford & Bull.

No. 786,510. PATENTED APR. 4, 1905.
T. S. MILLER.
CONVEYING APPARATUS.
APPLICATION FILED JAN. 31, 1901.
5 SHEETS—SHEET 5.
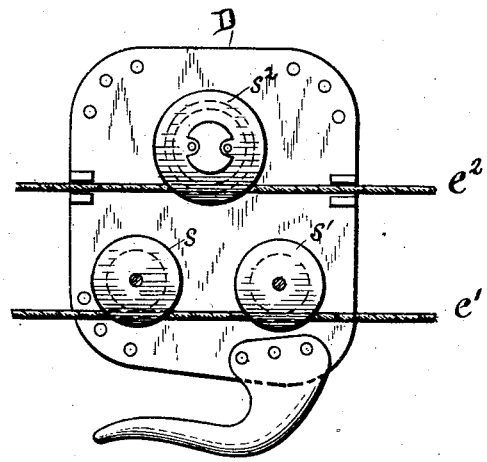

No. 786,510. Patented April 4, 1905.

UNITED STATES PATENT OFFICE.

THOMAS SPENCER MILLER, OF SOUTH ORANGE, NEW JERSEY.

CONVEYING APPARATUS.

SPECIFICATION forming part of Letters Patent No. 786,510, dated April 4, 1905.

Application filed January 31, 1901. Serial No. 45,432.

*To all whom it may concern:*

Be it known that I, THOMAS SPENCER MILLER, of South Orange, Essex county, and State of New Jersey, have invented a new and useful Improvement in Conveying Apparatus, some features of which apparatus are adapted for transmitting loads between fixed supports, but the apparatus as a whole is particularly adapted for transmitting loads between relatively moving supports, such as vessels at sea, of which the following is a specification.

In my patents numbered 637,142 and 637,143, in the particular forms of apparatus represented the means for actuating the transit-rope is located on the vessel at the transmitting end of the line; also, the bags or other load-receptacles are represented as being detached from the load-carriage in an elevated position, from which they slide down an inclination to the receiving-point.

My present invention embraces several features, prominent among which may be mentioned the following:

First, the control of the load in transit substantially independently of the apparatus located upon the collier or supply-ship, so that a war-ship or other coal or provision consuming ship may provision or coal itself from a collier or provision-ship unprovided with any special apparatus for that purpose. One form of this feature of my invention is shown in my application, Serial No. 692,171, filed September 29, 1898, in which the transit is controlled by a transit-motor on the war-ship and a sea-anchor independently of any special apparatus on the collier. A further-developed form is shown in the present application.

Second, the accomplishment of the above feature efficiently by apparatus adding a minimum to the burden which the war-ship is required to carry.

Third, the control of the load at or near the point of delivery by means acting upon the ropeway independently of the load to haul the ropeway downward as the load approaches or reaches the delivery-point.

Other features of my invention will be manifest from the following description and claims.

Figure 4:
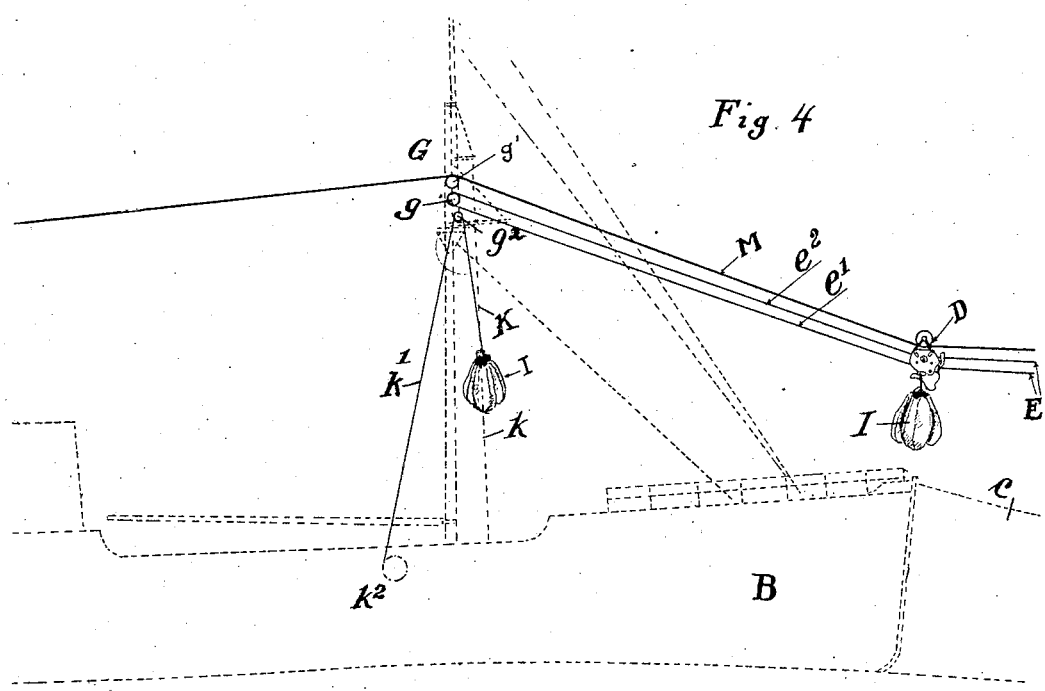
Figure 5:
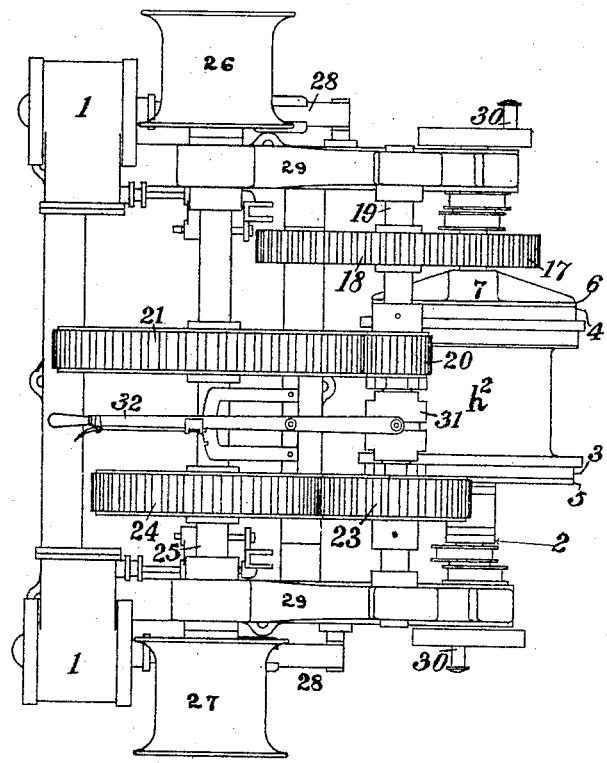
Figure 6:
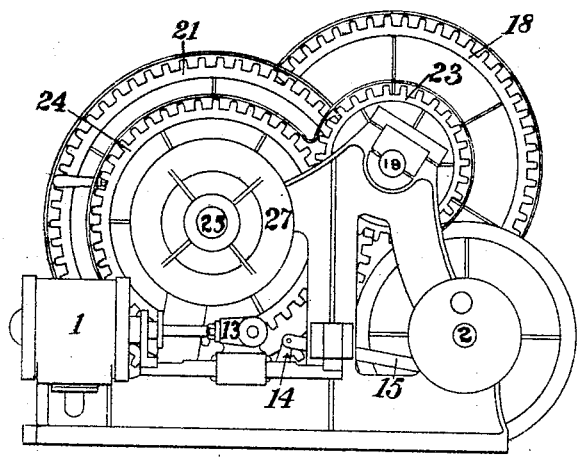
Figure 7:
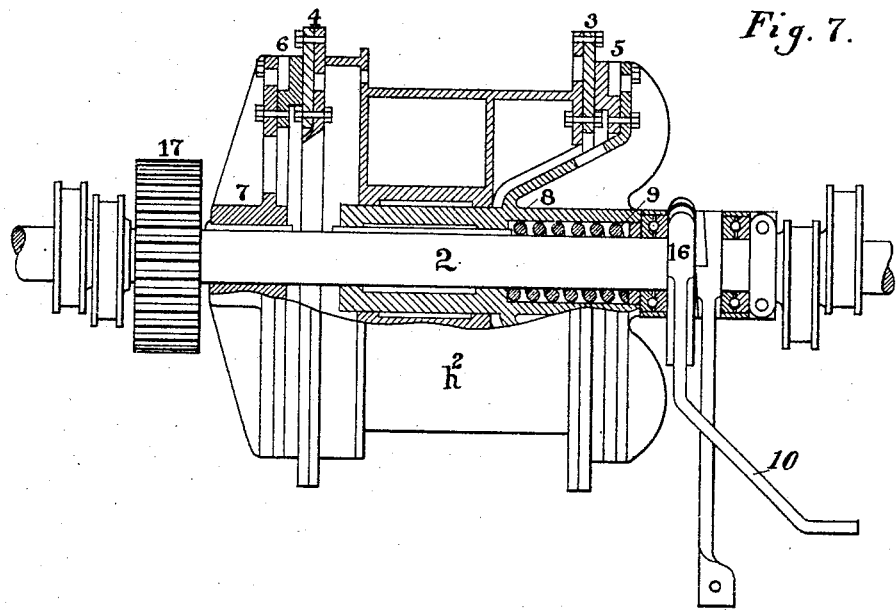
Figure 8:
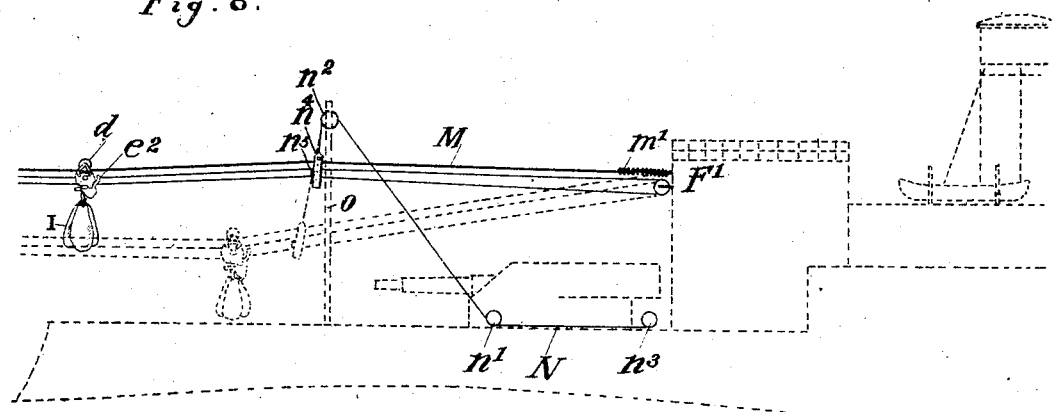

In the accompanying drawings, Figure 1 is a side view of a war-ship and collier containing my new apparatus in operating position. Fig. 2 is a detail of the apparatus for receiving the loads on the war-ship, showing also the position of the transit-actuator. Fig. 3 is a plan view of a detail corresponding with Fig. 2. Fig. 4 is a detail in elevation of the apparatus at the transmitting or collier end. Fig. 5 is a plan view of the backward transit-actuating engine with rope-drum. Fig. 6 is an elevation of the same. Fig. 7 is a sectional view of the slipping drum employed on the backward transit-actuating engine. The forward transit-actuating engine may have the same drum or a plain drum fixed to the crank-shaft. Fig. 8 shows an alternative plan for lowering the loads onto the war-ship, especially employed when the transit-actuators are located off of this ship. Fig. 9 is a detail showing the engagement between the transit-rope and the load-carriage.

A is a ship to which coal, provisions, mail, or other commodity are to be delivered from the ship B.

C is a tow-rope connecting the two ships.

The ship A is provided with propelling mechanism, so that while the apparatus is in operation this propelling mechanism causes the ship A to pull the ship B. If, as is preferable, the ship B is not anchored, this pulling action will tow the ship B; but otherwise, if the ship B is at anchor. In either case, however, the propelling of the ship A in a direction away from the ship B to which it is attached will serve to maintain as uniform a distance between the ships as the elements will permit.

D is a load-support from which the load is suspended while in transit. This load-support may be of the form shown in my said Patent No. 637,143, wherein it is shown as a carrier having a running engagement with one run of the transit-rope and a yielding traction engagement with the other branch thereof.

E is a transit-rope extending from an elevated support F on one ship to an elevated support G on the other. In the construction shown in the drawings this transit-rope consists of two runs or branches, one of which, $e'$, extends from the elevated support on ship A to and around a sheave $g$ on the elevated support of ship B, and the other of which, $e^2$, extends thence back to the elevated support on ship A. The two branches $e'$ and $e^2$ are preferably substantially parallel. The transit-rope E engages with the load-support D in some manner suitable for moving the load-support, the load-support being preferably provided with a device gripping one branch or run of the transit-rope, and with a device running upon the other branch thereof, a device of this character being shown in Fig. 9, wherein $s$ and $s'$ are sheaves or wheels journaled on the frame of the load-support and running on the branch $e'$ of the transit-rope, and $s^2$ is a stud having the form of a sheave, but fixed to the frame of the load-support so as to be incapable of rotation. The branch $e^2$ of the transit-rope takes sufficient turns around the stud $s^2$, so that the friction between it and said stud is sufficient to constitute a yielding engagement for the purposes of this apparatus. Generally one turn will be sufficient.

M is a rope or cable extending parallel with the branches of rope E from the elevated support F, with which it is connected by the spring $m'$, to and over a sheave $g'$ on the elevated support G, and thence to a tension device, such as the sea-anchor or drag $m$.

H' H² are two transit-motors by which motion is imparted to the transit-rope. One contains a forward transit-actuator $h'$, upon which one end of the transit-rope is coiled, and the other a backward transit-actuator $h^2$, upon which the other end of the transit-rope is coiled. For these two transit-actuators I employ a modification of the two deck winch-engines which are found upon the deck of a battle-ship generally about midships. A detail description of these two transit-actuators will be given hereinafter.

The support F is provided with sheaves $f'$ and $f^2$, over which, respectively, the branches or runs $e'$ and $e^2$ extend to the transit-motors H' and H².

N is a rope bending on the sheaves $n'$ $n^2$ and connecting the winch-head $n^3$ with the block $n^4$, which engages the ropes $e'$ and $e^2$ and M. The winch-head $n^3$ is the same which is usually placed upon the deck of a battle-ship for warping purposes. The block $n^4$ is provided with a saddle resting on the stationary rope M, so as to be substantially fixed in position thereon and with a sheave or sheaves on which the ropes $e'$ and $e^2$ run.

K is an elevator-frame running on guides $k$ and hoisted by a rope $k'$ and drum $k^2$, said rope passing over the sheave $g^2$ or by any other suitable means.

In operating the above-described apparatus to meet the varying conditions due to the lurching of the ships with the greatest certainty and quickness I construct and operate the forward transit-actuator so as to run at a speed adapted to actuate the transit-rope at a speed greater than the rapidity of change in length of the ropeway between its supports, due to the relative motion between said ships caused by the action of the waves. Since in the example shown there are two runs or branches of the transit-rope, this makes it preferable that the speed of the forward transit-actuator should exceed double the speed of the maximum movement between the ships, although dependence may be placed on the backward transit-actuator for taking up a portion of the slack produced by the lurching of the ships toward each other. I have found that for certain and accurate handling it is preferable that the forward transit-actuator should be positively driven, requiring the stopping and reversal of its engine for arresting the forward haul and paying out, respectively.

I construct and operate the backward transit-actuator so that during the forward transit it is constantly driven in opposition to the forward transit, and the forward transit is permitted by the slipping of the friction-surfaces of the backward transit-actuator, the power of which while sufficient to maintain in part the elevation of the load during transit is compelled to yield to the greater power of the forward transit-actuator.

The operation is as follows: A load I is hoisted from the deck of the collier to the masthead, where the sheave $g$ is mounted. An operator or any suitable mechanical contrivance at the masthead hangs the load upon the hook of the load-carriage D. The transit-actuators $h'$ and $h^2$ are then started in opposition to each other, whereupon the superior power of the forward transit-actuator $h'$ will cause the friction-surfaces of the backward transit-actuator $h^2$ to slip, and the load-carriage will be propelled forward. As it crosses the span the two runs or branches of the transit-rope E may not be sufficient for its support, although the resistance to slipping of the friction-surfaces of the backward transit-actuator greatly assists in doing so. The rope M, upon which the load-carriage wheel $d$ runs, acts as an additional support for the load. As the load reaches the war-ship an attendant causes the rope N to be wound on the winch-head $n^3$, so as to pull the rope M and the traction-rope E down from the position shown in dotted lines of Fig. 2 to the position shown in full lines. The slack in the traction-rope E necessary for this pulling-down action is given by the further slipping of the friction-surfaces of the backward transit-actuator $h^2$, and the necessary slack of the rope M is given by the movement of the sea-anchor $m$ through the water. In this manner the load I can be caused to rest on the deck of the war-ship at the moment it is released from the load-carriage by automatic means, such as shown in said Patent No. 637,143, or by an attendant, or by any other suitable means. Thus the load may be deposited directly upon the deck of the war-ship, so that the necessity heretofore existing of the dropping of the bags down an incline onto the deck of the war-ship and the consequent danger and injury to the load is avoided. Moreover, the transit-rope sheaves $f'$ $f^2$ can be located on the mast of the war-ship, which, by the improvement above described, is neither too high nor too far removed from the stern of the war-ship for the purpose.

As soon as the load is deposited on the deck of the war-ship, as above described, the attendant in charge of the rope N causes the ropeway to rise to its normal position by removing the strain upon the rope N, the forward-transit-actuator engine H' is at the same time reversed, permitting the backward transit-actuator to return the load-carriage to the collier for another load. Thus we have a gap, which in the example shown is between the two vessels at sea, at one side of which gap is one of the cableway-supports G, elevated above the lower level or bottom of the gap, or, in other words, above the level of the water. At the other side of the gap is the other cableway, F, also elevated above the lower level or bottom of the gap. There is also near to one of the cableway-supports and between it and the gap a load-rest, which in the example shown is the deck of the war-ship A, which load-rest coöperates with the ropeway-depressor to receive the load presented to it by the depression of the ropeway at the point of delivery after crossing the gap. There is also near the other cableway-support and between it and the gap another load-rest, which in the example shown is the deck of the collier, on which load-rest the load is presented to the load-elevator preparatory to starting on its journey across the gap. The deck of the collier thus constitutes a head load-rest and the deck of the war-ship a tail load-rest, both of which are distinct from the bottom of the gap, but which are not as high as the cableway-supports. The ropeway carries the load-carriage through the air from the point above the head load-rest to a point above the tail load-rest. The load is hoisted from the head load-rest to the elevation at which the load-carriage starts and the ropeway is depressed at the tail load-rest to deliver the load thereon.

In the modification shown in Fig. 8 the transit-motors are located off the receiving-ship, the ropeway is secured at F' sufficiently forward of the stern and low enough down so that the load will be brought down to substantially the deck-level by the sag of the ropeway under the weight of the load, as shown in dotted lines. The sheave $n^2$ is mounted above the level of the ropeway on an upright O. The rope N normally supports the ropeway from sagging. The attendant so controls the rope N that it supports the ropeway in the position shown in full lines, Fig. 8, until the load is carried well over the deck of the receiving-ship. Then the attendant pays out on rope N so as to lower the load to the deck, as shown in dotted lines.

Whether the loading of the ropeway at the point of delivery be accomplished by hauling down, as in Fig. 3, or by permitting to sag, as in Fig. 8, the deck at the stern of the vessel constitutes a load-receiving support intermediate the ropeway-supports, which is preferably at so short a distance below the ropeway in its normal position that the inclination of the ropeway in its lowered or delivery position adjacent to the point of delivery is less than that which would cause substantial travel of the load-carriage by gravity. In other words, the traversing of the carriage is preferably substantially dependent upon its normal means of propulsion as it approaches the delivery-point, such as the transit-rope E, whether the ropeway be in transporting or in delivery position. Indeed, as will be seen by reference to Fig. 2, the short run of the ropeway between the load-carriage and the block $n^4$ presents a slight upward inclination.

I have described the collier as being in tow of the war-ship, but it is evident that a similar form of apparatus may be employed with the war-ship in tow of the collier, in which case the same engines on the war-ship may be employed as the transit-actuators; but the forward mast instead of the after mast would be employed as a support and the load would be deposited on the bow of the war-ship instead of on the stern. Also the after instead of the forward mast of the collier would be employed for the support. Also the sea-anchor would trail behind the war-ship and the line M would be attached to the collier.

By the combination of the improvements above described I am enabled to mount substantially all of the special machinery required upon the war-ship without increasing the burden of the war-ship unduly, if at all, because I utilize engines already on a war-ship, and the combination therewith of the transit-actuators $h'$ $h^2$ is so small a burden as to be substantially negligible, and even this may be largely counterbalanced by dispensing with the delivery apparatus of my said Patent No. 637,143, which is enabled by reason of delivering directly on deck, as hereinabove described.

The backward transit-motor $H^2$ (shown in Figs. 5 and 6) may be described as follows: 1 1 are the cylinders of a reversible link-motion engine driving the shaft 2. The backward transit-actuator has a rope-drum $h^2$, revoluble on said shaft, provided on opposite ends with disk friction-surfaces 3 4, coöperating with disk friction-surfaces 5 6, respectively, secured to turn with the shaft 2. The hub 7, which carries the friction-disk 6, is fixed upon the shaft 2. The hub 8, which carries the friction-disk 5, is splined to the shaft 2, so as to turn therewith, but to slide thereon. 9 is a spring bearing against the end of the hub 8 and thrust against said hub by any suitable mechanism. The thrust whereby the operator causes the engagement of said friction-surfaces with the backward actuator $h^2$ is transmitted wholly through said spring 9. Therefore the power of said spring will determine and maintain with reasonable constancy the tension of drum $h^2$ upon the rope branch $e^2$. When, therefore, the attendant sets his friction-operating mechanism so as to compress the spring 9, the friction-surfaces of the drum $h^2$ will slip and the drum will pay out as long as the pull of the rope branch $e^2$ exceeds the power of said friction-surfaces, as will be the case when the ships lurch away from each other and also when the transit-actuator $h'$ is producing a forward transit of the load. On the other hand, whenever the pull of the rope branch $e^2$ is less than the power of the friction-surfaces on the drum $h^2$ that drum will haul in, as is the case when the transit-actuator $h'$ permits any slack in the transit-rope. The operator at the backward transit-actuator may therefore set the friction controlling-lever so as to produce an amount of compression of the spring 9 equivalent to the tension that the drum $h^2$ is desired to operate under. 10 is the friction operating-lever. This operating-lever 10 may be connected to another lever close to the engine-reversing lever, so that the same operator can operate both levers without changing his position. In the form of construction shown in Fig. 7 the lever 10 is connected with a collar 16 on the shaft 2, which collar is provided with a cam-surface, whereby the thrust is given to the spring 9. 17 is a gear-wheel fixed to the shaft 2, which drives the larger gear-wheel 18, fixed to the counter-shaft 19. 20 is a gear-wheel loosely mounted upon the shaft 19 and meshes with the gear-wheel 21, fixed to the winch-shaft 25. 23 is a gear-wheel loosely mounted upon the shaft 19 and meshes with the gear-wheel 24, fixed to the winch-shaft 25. The speed ratio between the gears 20 21 and between the gears 23 24 differs, whereby the winch-shaft may be turned at two speeds. 26 and 27 are winch-heads fixed on the ends of said winch-shafts, respectively. A clutch 31 is splined to the shaft 19 and has a clutch member on each end adapted to engage similar clutch members on the gears 20 and 23, so as to temporarily fix either wheel to the shaft. This clutch is controlled by a lever 32, which has the usual quadrant and catch.

The forward transit-motor is a duplicate of the backward transit-motor, excepting that the drum, as shown in Fig. 6, is preferably fixed to the shaft instead of being provided with friction mechanism.

In both transit-motors I have employed the crank-shaft of the engine as the rope-drum shaft and have driven the winch-shaft from the rope-drum shaft by interposed gearing. The engine is capable of driving the crank-shaft at a speed which propels the transit-rope more than twice as fast as any movement of either support toward the other. By the gearing the winch-shaft receives its motion at the diminished speed required. The cylinders 1 1 are located at the front of the frame, and connecting-rods extend on the outside of the end frames 29 29 beneath the winch-heads 26 and 27, respectively, to the crank-pins 30 30, the crank-shaft 2, which is also the drum-shaft, being located substantially on a level with the cylinders. The counter-shaft 19 and winch-shaft 25 are located at a higher level and over the space between the drum-shaft 2 and the cylinders. The relative position of the parts is such that the amount of deck-room required is very little in excess of the ordinary battle-ship winch-engine.

Although I have shown this apparatus as applied to the transmission of loads between two supports both of which are moving, its utility would nevertheless be available for transmitting loads between any two relatively moving supports—for example, where the relative movement is produced entirely by the movement of one of the supports, the other being stationary. An illustration is the relative to-and-fro motion produced by the waves between two ships at anchor or between a ship and a wharf. The method of lowering the ropeway for attaching or detaching a load is also advantageous where the supports are fixed.

What I claim, and desire to secure by Letters Patent, is—

1. In combination, a supply-ship, a consuming-ship, a transit-rope connecting the two, a load-carriage, a forward transit-actuator on said consuming-ship and a backward transit-actuator exterior to said supply-ship.

2. In combination, a supply-ship, a consuming-ship, a transit-rope connecting the two, a load-support, a forward transit-actuator and a backward transit-actuator, both said actuators being on said consuming-ship.

3. In combination, a supply-ship, a consuming-ship, a transit-rope connecting the two, a load-carrier, a supporting-rope, forward and backward transit-actuators and a supporting-rope tension-actuator; all of said actuators being exterior to said supply-ship.

4. In combination, a supply-ship, a consuming-ship, a transit-rope between the two, a load-carrier, a supporting-rope, a supporting-rope tension-actuator exterior to said consuming-ship and forward and backward transit-actuators located on said consuming-ship.

5. In combination, a supply-ship, a consuming-ship, a ropeway connecting them, a load-carriage, a rope-drum mechanism on the consuming-ship and a sea-anchor participating in the control of the load during transit.

6. In combination, a supply-ship, a consuming-ship, a ropeway connecting them, a load-carriage, means exterior to said supply-ship whereby the strain on said ropeway is controlled and means also exterior to said supply-ship whereby the ropeway is lowered substantially at the point of delivery on the arrival of the carriage.

7. In combination, a supply-ship, a consuming-ship, a transit-rope, a load-carriage, a forward transit-actuator on said consuming-ship, a backward transit-actuator exterior to said supply-ship and means on said consuming-ship whereby the transit-rope is lowered substantially at the point of delivery on the arrival of the carriage.

8. In combination, two supports having a relative to-and-fro motion, a ropeway extending between the same, tension mechanism moving responsively to said to-and-fro motion and means engaging with said ropeway intermediate its supports whereby the elevation of said ropeway is controlled independently of said to-and-fro motion substantially at the delivery-point of said ropeway.

9. In combination, two supports having relative to-and-fro motion, a load-support, a transit-rope, a supporting-rope, tension mechanism for both of said ropes moving responsively to said to-and-fro motion and means whereby the elevation of said ropes is controlled independently of said to-and-fro motion substantially at the delivery-point of said ropeway.

10. In combination, a ropeway containing a traveling rope, a yielding tension device whereby it is held taut, a load-carriage propelled by said traveling rope, and means engaging the ropeway independently of the carriage whereby said tension device is caused to yield and lower the ropeway substantially at the point of delivery on the arrival of the carriage.

11. In combination, a ropeway extended across a gap, supports of constant elevation therefor on opposite sides of said gap and elevated above the bottom thereof, a load-rest on one side of said gap, a load-carriage, a traction-rope engaging said carriage and means engaging the ropeway exterior to the carriage whereby the ropeway is deflected toward said load-rest.

12. In combination, with the deck and mast of a ship, a hauling-engine on the deck, a ropeway extending from said hauling-engine over a sheave on said mast and thence to a distant support, a load-support, a downhaul-rope extending upwardly to said ropeway from the point between the mast and the end of the ship and means whereby said downhaul-rope engages said ropeway independently of the load-support.

13. In combination, two supports having a relative to-and-fro motion, a transit-rope between the same, a load-carrier having a yielding traction engagement with said transit-rope, a transit-actuator and means whereby the elevation of said transit-rope is controlled substantially at the delivery-point upon the arrival of said load-carrier.

14. In combination, two supports having a relative to-and-fro motion, a transit-rope extending between the same, a load-carrier having a yielding traction engagement with said rope, a transit-actuator, tension mechanism moving responsively to said to-and-fro motion and means whereby the elevation of said rope is controlled independently of said to-and-fro motion substantially at the delivery-point upon the arrival of said load-carrier.

15. In combination, two relatively moving supports, a transit-rope, a load-support moved by said transit-rope, a forward transit-actuator, a backward transit-actuator and means whereby said transit-rope is lowered at a point intermediate said supports.

16. In combination with a boat and two winch-engines thereon, a forward transit-actuator actuated by one of said winch-engines, a backward transit-actuator actuated by the other of said winch-engines and a transit-rope extending from one of said actuators to a distant support and back again to the other of said actuators.

17. In a conveying apparatus, in combination, a forward transit-actuator, a backward transit-actuator, a transit-rope extending from one of said actuators to the other, a reversible engine whereby said forward transit-actuator is driven and a friction-engine whereby said backward transit-actuator is driven.

18. In combination, a pulled boat, a pulling-boat, two transit-motors located on one of said boats, an elevated support on each boat, a transit-rope extending from one of said transit-motors to the elevated support on the same boat, thence to the elevated support on the other boat, thence back to the first-mentioned elevated support and thence to the other transit-motor and a load-support actuated by said transit-rope.

19. In combination, a pulled boat, a pulling-boat, two transit-motors located on one of said boats, elevated sheaves on both boats, a transit-rope extending from one of said transit-motors to an elevated sheave on the same boat, thence to and around an elevated sheave on the other boat, thence back to and about an elevated sheave on the first boat and thence to the other transit-motor, and a lowering-rope engaging with said transit-rope near said elevated support.

20. In combination, two supports having a relative to-and-fro motion, a transit-rope extending between the same, a forward transit-motor operating substantially irresponsively to said to-and-fro motion, a tension mechanism moving responsively to the resultant of the forward transit motion and said to-and-fro motion and a load-carrier actuated by said transit-rope.

21. In combination, a pulling-boat, a pulled boat, a transit-rope between them, a load-support moved thereby, a forward transit-actuator, a drum carrying the tail end of said rope, a friction-clutch engaging said drum and running in opposition to the forward movement of said rope and means whereby the elevation of said rope substantially at the point of delivery is controlled upon the arrival of the load-support.

22. In combination, a supply-ship, a consuming-ship, forward and backward transit-actuators on said consuming-ship, a transit-rope extending from the backward actuator to the supply-ship and back to the forward actuator, a supporting-rope, a load-carrier forming a running engagement with one run of said transit-rope and a yielding traction engagement with the other run thereof, a running engagement with said supporting-rope, a supporting-rope tension-actuator and a downhaul-rope acting upon said supporting and transit ropes independently of said load-carrier substantially at the point of delivery.

23. In combination, two supports having relative to-and-fro movement, a transit-rope extending between the same, a forward transit-actuator and a backward transit-actuator acting upon said rope antagonistically, the power applied to said backward transit-actuator being adapted to yield to the power of the forward transit-actuator, and means whereby the elevation of said rope is controlled between its supports.

24. In combination, a towing-boat, a towed boat having relative to-and-fro movement, a transit-rope extending between the same, forward and backward transit-actuators acting upon said rope antagonistically, the power applied to said backward transit-actuator being adapted to yield to the power of the forward transit-actuator, a supporting-rope, and a sea-anchor whereby said supporting-rope is held under tension.

25. In combination, a ropeway, the supports therefor, a load-carriage thereon, means for propelling said load-carriage on said ropeway, a load-receiving support intermediate said ropeway-supports and means whereby said ropeway is lowered over said receiving-support; the distance between said ropeway in its normal position and said receiving-support being such that the inclination of said ropeway in its lowered position adjacent to said point of delivery is less than that which would cause substantial forward travel of the carriage by gravity.

26. In combination, a ropeway extended across a gap, supports therefor on opposite sides of said gap and elevated above the bottom thereof, a load-rest on one side of said gap, a load-carriage, a traction-rope engaging said carriage, means engaging the ropeway exterior to said carriage whereby said ropeway is deflected toward said load-rest and a yielding tension device operating on said ropeway in antagonism to said deflection.

27. In combination, a ropeway extended across a gap, supports therefor on opposite sides of said gap and elevated above the bottom thereof, a load-rest on one side of said gap, a load-carriage, a traction-rope engaging said carriage, means engaging the ropeway and the traction-rope exterior to the carriage whereby the same are deflected toward said load-rest and yielding tension mechanism acting upon said ropeway and said traction-rope in antagonism to said deflection.

28. In combination, a ropeway extended across a gap, supports therefor on opposite sides of said gap and elevated above the bottom thereof, a load-rest on one side of said gap, a load-carriage, a traction-rope engaging said carriage, a drum connected with each end of said traction-rope and means engaging the ropeway exterior to the carriage whereby the ropeway is deflected toward said load-rest.

29. In combination, a ropeway extending across a gap, supports therefor on opposite sides of said gap and elevated above the bottom thereof, a load-rest on one side of said gap, a load-carriage and downwardly-hauling means engaging the ropeway exterior to the carriage whereby the ropeway is positively deflected toward said load-rest.

30. In combination, a ropeway extended across a gap, supports therefor on opposite sides of said gap and elevated above the bottom thereof, a head load-rest on one side of said gap, a tail load-rest on the other side of said gap, a load-carriage, a hoist above the head load-rest and a downwardly-hauling device above the tail load-rest engaging the ropeway exterior to said carriage.

31. In combination, two load-rests on opposite sides of the gap, a cableway-support erected on each load-rest, a cableway between said supports, a hoist above one of said load-rests, a ropeway-depressor above the other of said load-rests and a yielding traction device acting upon said ropeway in opposition to said depressor.

In testimony whereof I have affixed my signature in the presence of two witnesses.

THOMAS SPENCER MILLER.

Witnesses:
H. L. REYNOLDS,
W. A. PAULING.